(12) United States Patent
Hamlin (10) Patent No.: US 6,836,895 B2
(45) Date of Patent: Dec. 28, 2004

(54) HYBRID ELECTRONIC E-MAIL SERVER SYSTEM AND METHOD

(76) Inventor: Howard Hamlin, 24 Elm St., Centereach, NY (US) 11720

(*) Notice: Subject to any disclaimer, the term of this patent is extended or adjusted under 35 U.S.C. 154(b) by 102 days.

(21) Appl. No.: 09/896,736

(22) Filed: Jun. 29, 2001

(65) Prior Publication Data

US 2002/0184323 A1 Dec. 5, 2002

Related U.S. Application Data

(60) Provisional application No. 60/214,986, filed on Jun. 29, 2000.

(51) Int. Cl.[7] ................................................ G06F 9/44
(52) U.S. Cl. ................................ 719/328; 709/203
(58) Field of Search ........................... 719/310–320, 719/328–330; 709/200–203

(56) References Cited

U.S. PATENT DOCUMENTS 5,809,242 A * 9/1998 Shaw et al. ................ 709/217
6,356,937 B1 * 3/2002 Montville et al. .......... 709/206
6,571,296 B1 * 5/2003 Dillon ........................ 709/250

OTHER PUBLICATIONS (no author given) "Java 1.2 Unleashed—Using JavaMail", Chapter 34, Sams.net, 1998, pp(15).*

* cited by examiner

Primary Examiner—St. John Courtenay, III
(74) Attorney, Agent, or Firm—Panagiota Betty Tufariello (57) ABSTRACT

A system for receiving, reviewing, processing, forwarding, posting and accessing e-mail messages which comprises a Hybrid e-mail server, an API interface locator on the Hybrid e-mail server and a web application server all communicatingly connected to each other. The system is capable of utilizing the web application server as a scripting engine and providing access to all of the Internet's resources for use in formulating and posting the responses to e-mail messages without any need for human intervention.

2 Claims, 5 Drawing Sheets

Figure 1

*(Prior Art)*

HYBRID ELECTRONIC E-MAIL SERVER SYSTEM AND METHOD

This application claims the benefit of provisional application Ser. No. 60/214,986 filed Jun. 29, 2000.

FIELD OF THE INVENTION

The present invention relates to a new system and method for receiving and delivering electronic mail and electronic messages using the Internet. More particularly, the present invention relates to a system and method comprising a Hybrid Email Server (hereinafter "HEMS"), which utilizes standard Web Application Servers (hereinafter "WAS") for all functionality.

BACKGROUND OF THE INVENTION

Since the advent of the "pony express", through the time of the establishment of the U.S. Postal Service and right into the present time, written communication via the mails has changed very little. It basically comprises the following steps: preparing the letter, placing the letter in an envelope, stamping the envelope, "dropping the envelope in the mail", picking up the letter containing envelope and delivering the letter via land, air or sea to the recipient; with no guarantees that such delivery will occur within a reasonable amount of time.

This was and still is a labor intensive process. Such process becomes even more complicated, burdensome and unreliable when the sender has more than one letter to send to more than one recipient, to more than one location with information that is hard to come by.

With the development of computer technology and more particularly with the development of the the world wide electronic web (hereinafter "Internet") more and more people choose to forego the traditional mails' process in favor of electronic mail or electronic messaging using the Internet.

Figure 1:
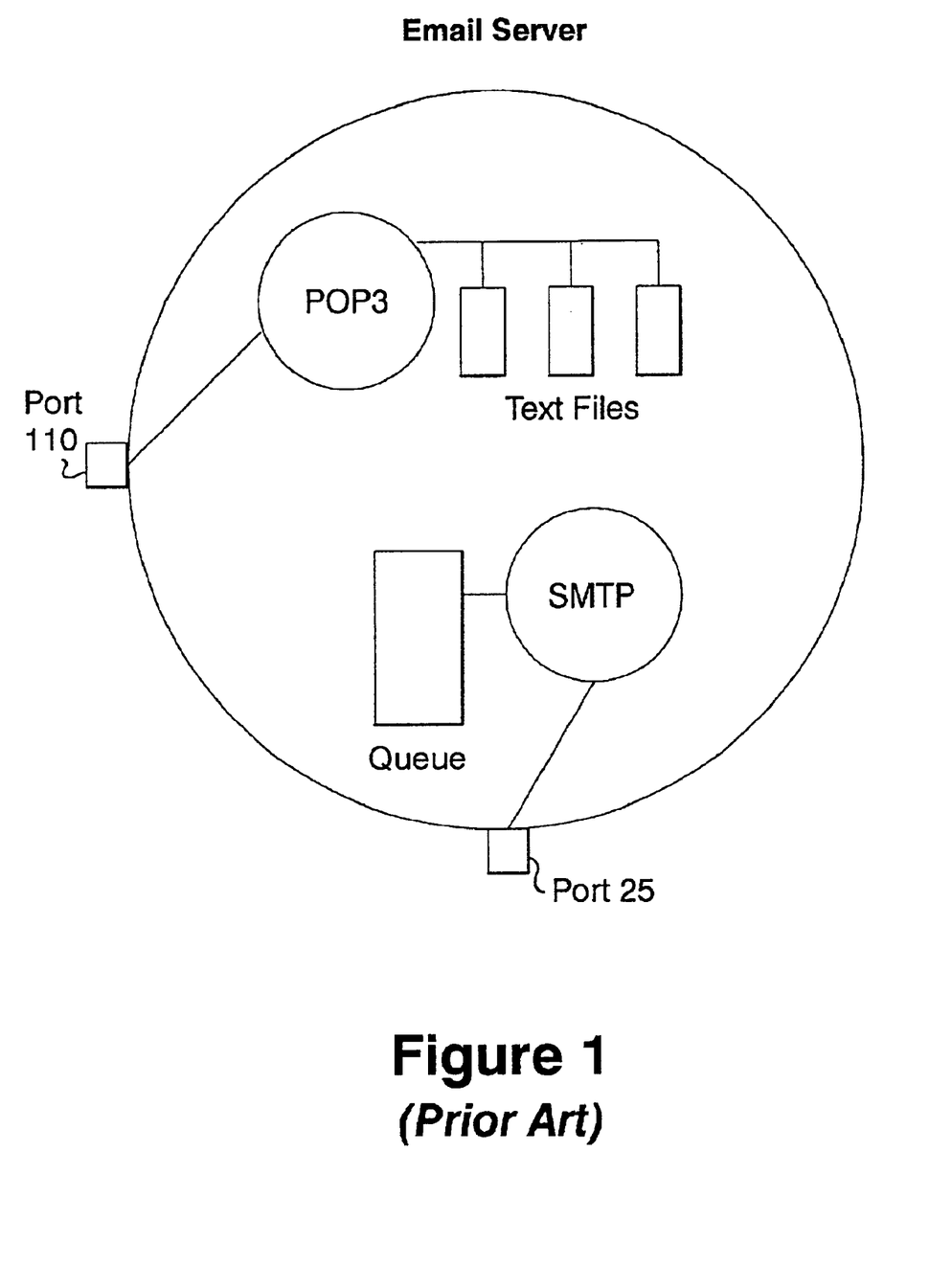
FIG. 1 (Prior Art) is a representative schematic of a prior art Email server.

Such electronic mail and electronic messaging is channeled from the sender to the recipient via electronic transfer systems called Email servers. As shown in FIG. 1 (prior art), prior art Email servers comprise one Simple Message Transfer Protocol (hereinafter "SMTP) server and one Post Office Protocol Version 3(hereinafter "POP3") server. They process and transmit e-mail to its destination using standardized protocols such as the commonly used Simple Message Transfer Protocol (hereinafter "SMTP") and the Post Office Protocol Version 3 (POP3).

Figure 2:
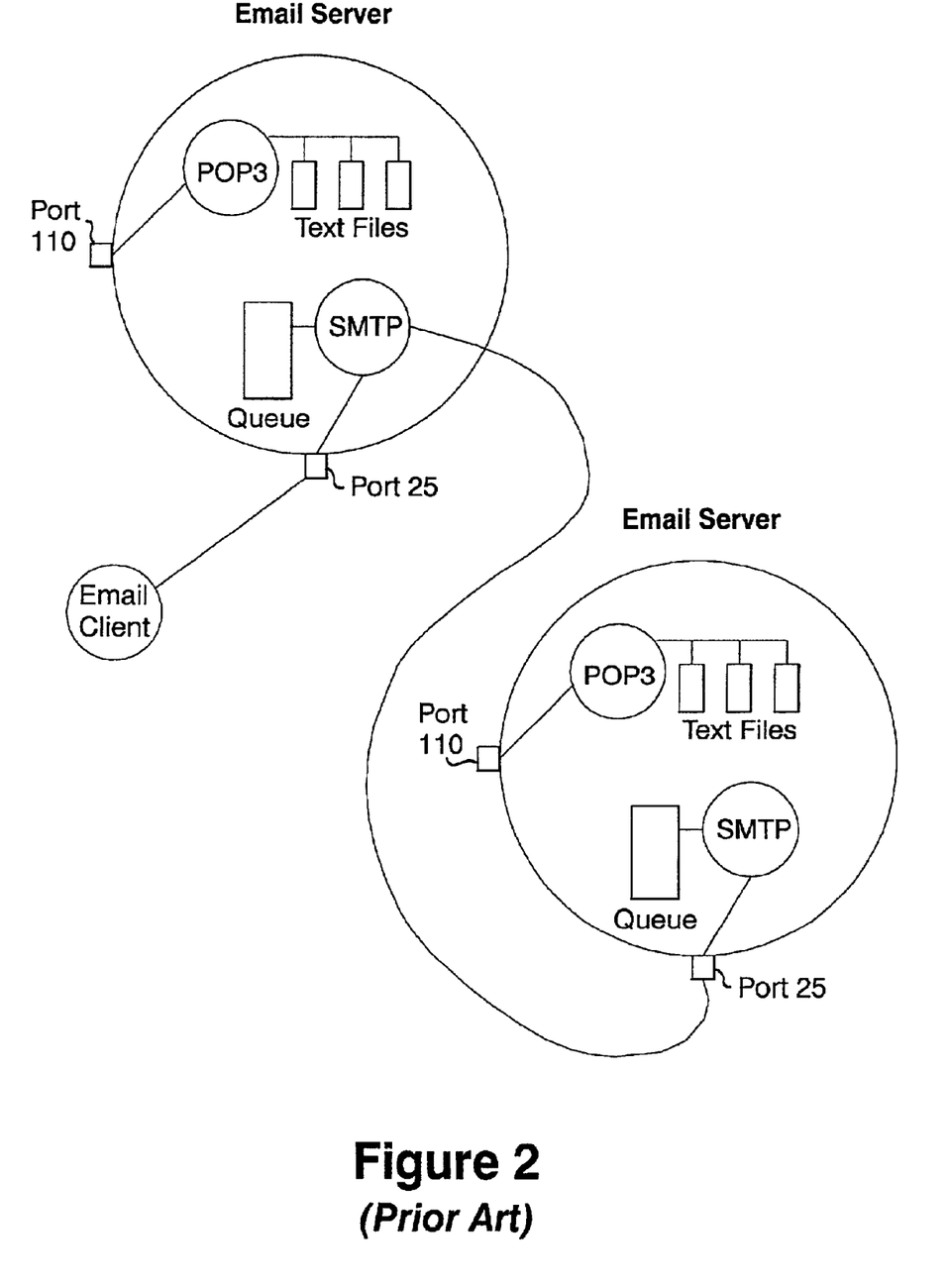
FIG. 2 (Prior Art) is a schematic diagram setting forth the manner in which prior art SMTP servers located on two remote prior art Email servers communicate with each other.

Whenever a piece of e-mail is sent, the e-mail client interacts with the SMTP server to do the sending. The SMTP server on the host Email server may have conversations with other SMTP servers to actually deliver the e-mail. Such a conversation is depicted in FIG. 2 (prior art).

The prior art process for sending an e-mail comprises the following steps: the e-mail client connects to the SMTP server at the host Email server. The e-mail client has a conversation with the SMTP server. The conversation is an extremely simple set of text commands and responses. The e-mail client tells the SMTP server the address of the sender and the address of the recipient, as well as the body of the message.

The SMTP server takes the "TO" address and breaks it into two parts: (1) the name of the recipient and (2) the domain name. If the TO address is another user on the same host Email server (the domain name of the recipient happens to in fact coincide with the domain name of the host Email server) the SMTP server will simply hand the message to the POP3 server for the host Email server using a little program called the delivery agent. If, on the other hand, the recipient is in another remote Email server (the domain name of the recipient does not coincide with the domain name of the Host Email server), the SMTP server needs to communicate with that domain.

The SMTP server on the Host Email Server then has a conversation with a Domain Name Server, gets the identifying information for the Domain of the remote Email server and connects to the SMTP of the remote Email server. It has the same simple text conversation as the e-mail client had with the SMTP server on the Host Email server and gives the message to the remote SMTP server. The remote SMTP server recognizes that the domain name of the recipient is the same domain as the domain of the remote Email server and so it hands the message to the remote Email server's POP3 server. The POP3 server, in turn puts the message in the recipient's mailbox.

If for some reason the SMTP server on the Host Email server fails to connect with the SMTP server on the remote Email server, then the message goes into a queue. The SMTP server on most prior art Email servers uses a program called sendmail to do the actual sending, and so this queue is called the sendmail queue. Sendmail will periodically try to resend the messages in its queue.

To check e-mail in the prior art Email servers, the e-mail client connects to the POP3 server of the Host Email server. The POP3 server requires an account name and a password. Once the e-mail client logs in, the POP3 Server opens the client's text file and allows access to it. The e-mail client then issues a series of commands to bring copies of the e-mail messages to the client computer. It will then delete the messages from the host Email server.

Traditional prior art Email servers and their component SMTP and POP3 servers are usually designed by a developer and then sold to users as a complete system with a fixed set of features. They cannot be easily modified. As a matter of fact, the only way that such Email servers can be modified or augmented and expanded, is by returning them to the software developer/manufacturer for the installation of additional custom designed features at an additional cost.

One of the biggest disadvantages of traditional prior art Email servers is that their functionality is fixed. Users cannot easily add or modify features or develop their own custom Email servers utilizing existing application servers or server side scripting/programming languages. Any modification to server functionality can be developed only by programmers who are familiar with high level programming languages such as C++ and with the particular mail server's Application Programming Interface (hereinafter "API").

Another disadvantage in existing prior art Email servers is that there is little choice in defining an e-mail storage method. E-mail needs to be electronically stored on the Email server until the recipient actually retrieves the e-mail via their client computers.

Exactly because the functionality of traditional prior art Email servers is fixed, responding to an e-mail can only be done on a one to one basis. In other words, someone has to turn on their client computer, retrieve the mail, formulate an answer and then respond to the sender, one e-mail at a time. Thus, while the medium of transferring mail may have changed from a manual one to an electronic one, written communication is still entrenched in the old ways of transfer.

Finally, yet another disadvantage of traditional prior art Email servers is the fact that they can communicate with only SMTP and POP3 protocols. This makes their application not only fixed and limited exclusively to e-mail applications, but it completely prevents them from any communication with any other part of the Internet; thereby cutting off a tremendous amount of resources to the parties who are communicating via e-mail.

SUMMARY OF THE INVENTION

Accordingly, it is an object of the present invention to provide for a Hybrid Email Server (hereinafter "HEMS") which can be easily modified or augmented and expanded, without returning it to the software developer/manufacturer for the installation of additional custom designed features at an additional cost.

It is another object of the present invention to provide for an HEMS whose functionality is not fixed.

It is yet another object of the present invention to provide for an HEMS whose users can easily add and modify features, or develop their own custom e-mail server utilizing existing application servers or server side scripting/programming languages.

It is still another object of the present invention to provide for an HEMS whose functionality can be modified without the intervention of programmers familiar with high level programming languages such as C++ and with the particular mail server API.

It is a further object of the present invention to provide for an HEMS which will provide choices in defining an e-mail storage method.

It is also an object of the present invention to provide a system and method (i) for receiving more than one e-mail at a time, retrieving the mail, formulating a response and posting said response without human intervention; and (ii) capable of communication with other parts of the Internet using protocols other than SMTP and POP3.

Briefly stated yet another object of the present invention is to provide a system and method for receiving, sending and accessing electronic mail using an HEMS communicatingly connected to a Web Application Server. The HEMS comprises an SMTP server communicatingly connected to an API interface, a Post Server also communicatingly connected to the API interface, a POP3 server and a template memory device designed to run each of the three servers set forth above. The HEMS is configured to listen for and receive incoming mail from a client computer using traditional SMTP protocols, which it then reformats into a data package which, through the API interface can be sent to the Web Application Server for reading, processing and responding. The WAS' response to the e-mail is then sent back to the HEMS' SMTP server through the API where it is further processed and either forward to the HEMS' local POP3 server, or through the POST server is sent on and posted to a POP3 server of a remote prior art Email server.

The novel features which are considered characteristic of the present invention are set forth in the appended claims. The invention itself however, both as to its construction and its method of operation, together with additional objects and advantages thereof, will be best understood from the following description of the specific embodiments when read and understood in connection with the accompanying drawings.

LIST OF REFERENCE NUMERALS UTILIZED IN THE DRAWINGS

| | |
|---|---|
| 10 | The inventive system and method for receiving, sending and accessing e-mail via a web application server |
| 100 | Hybrid Email Server (Hereinafter "HEMS") |
| 101 | Client Computer |
| 104 | First communications interface |
| 105 | External network |
| 106 | second communications interface |
| 110 | SMTP server |
| 112 | Template Memory Device |
| 116 | General Storage Facility or data management system |
| 120 | API interface |
| 130 | Post Server |
| 140 | POP3 Server |
| 200 | Web Application Server |

DETAILED DESCRIPTION

Figure 3:
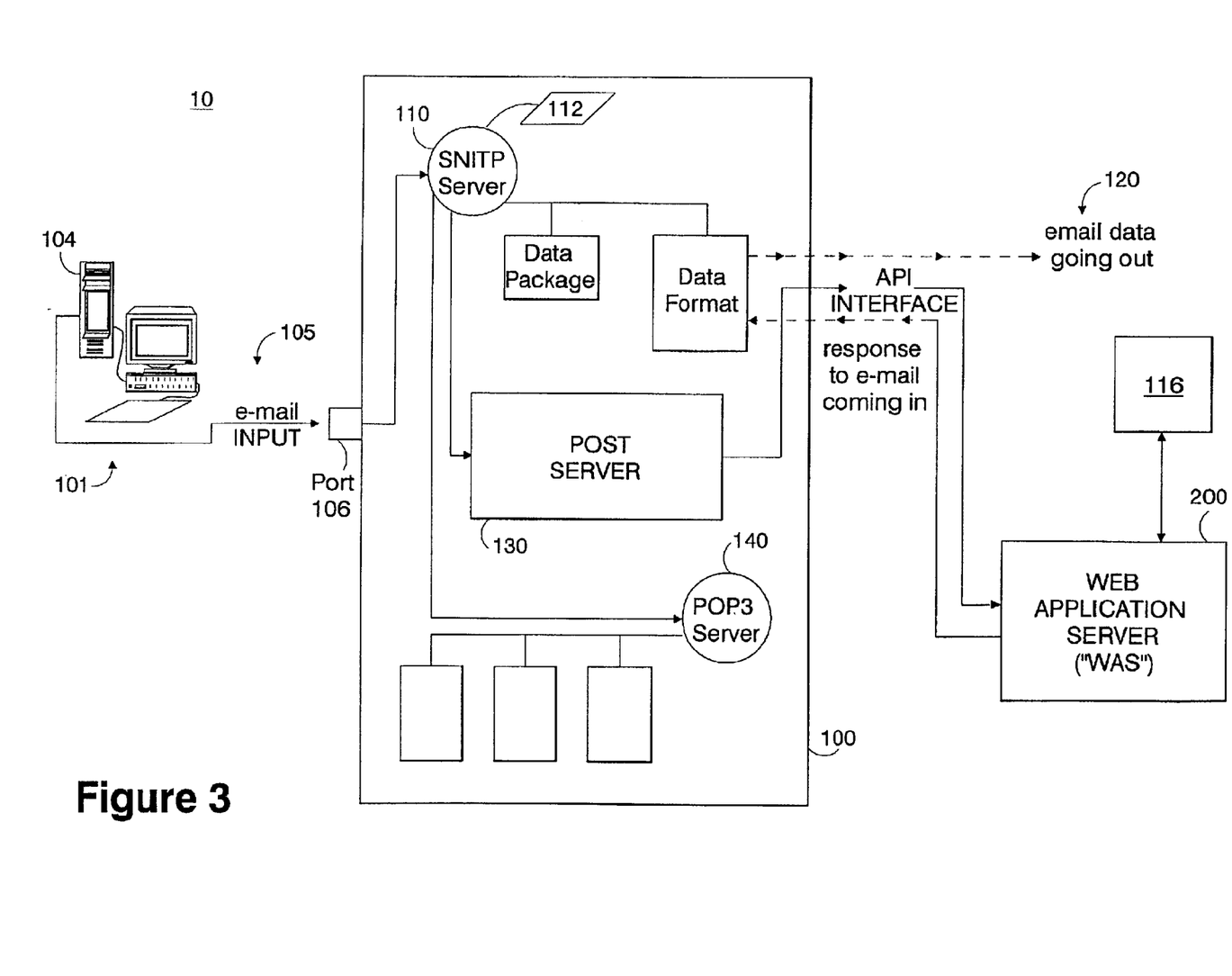
FIG. 3 is a schematic of the inventive system and method for receiving, sending and accessing electronic mail using an HEMS communicatingly connected to a Web Application Server.

Referring now to the figures, in which like numerals indicate like parts, and particularly to FIG. 3, which is a schematic of the present invention, the present inventive system and method for receiving, sending and accessing electronic mail using a Web Application Server is generally depicted at 10.

Specifically, the system 10 comprises a Hybrid Email Server 100 (hereinafter "HEMS") communicatingly connected to a Web Application Server 200 (hereinafter "WAS") through an API interface 120. The HEMS 100 in turn comprises an SMTP server 110 which is communicatingly connected to the API interface 120, a Post server 130 communicatingly connected to the API interface 120 and having access to remote POP3 Servers in remote prior art Email servers, a POP3 server 140 and a template memory device 112.

As seen in FIG. 3, the HEMS 100 interfaces with a client computer 101 via a first communications interface 104 located on said computer 101, an external network 105, and a second communications interface 106 located onto said HEMS 100. The client computer 101 is the source or generator of e-mail messages sent to the HEMS 100 and may comprise any combination of hardware or software that can interact with the HEMS 100; including a conventional commercially available personal computer. The communications interface 104 is any device, such as a modem, which allows the client computer 101 to communicate with other computers and particularly allows the client computer 101 to communicate with the HEMS 100. The external network 105 may be the telephone network, a proprietary wide area network, or the Internet. The second communications interface 106 is any device, such as a modem, network interface unit or network card that allows communication between computers. When the client computer 101 interfaces with the HEMS 100, it specifically communicates with the SMTP server 110 using the SMTP protocol. It is the HEMS's SMTP server that receives all e-mail communications.

The HEMS' template memory device 112 comprises a plurality of templates i.e customized operating programs, which are the present invention's protocols for receiving and transmitting mail. Which templates are actually used will depend on the protocol employed by the client computer 101. Thus, if the client computer uses Simple Message Transfer Protocol (SMTP), then the SMTP 110 employs the "HELO", "MAIL", "RCPT" and "DATA" templates. If the client computer uses Post Office Protocol (POP), then the HEMS' POP3 server 140 employs the "USER", "PASS", and "QUIT" templates.

It is particularly noted that, unlike prior art Email servers, the HEMS comprises no scripting engine capable of running HEMS' template memory device. On the other hand, it does have an API interface 120 which is the communications interface between the SMTP 110 and the Web Application Server (hereinafter "WAS") 200. It is this API interface that (i) enables the SMTP 110 to reach outside of and beyond the HEMS' boundaries to utilize the WAS as the scripting engine to run the template memory device; (ii) eliminates all need for human intervention in the response to e-mail messages; (iii) provides access to the all of the Internet's resources for use in the formulations of the responses to the e-mail messages, at a speed that defies imagination; and (iv) for the first time allows an Email server to communicate with and gather information from the Internet, via a Web Application Server.

The WAS 200 is designed to enable the serving of dynamic content on the HEMS. Dynamic content can be linked to database queries or other types of dynamic data. The WAS is designed with at least three standard APIs that allow it to interface with the HEMS' API Interface 120. It is the WAS that will now process the mail, via supplied templates, open the mail, read it, gather the information requested using the appropriate search protocols to search the Internet and formulate a response. It will then send the e-mail response back to the HEMS' SMTP server through the API interface 120 for further processing and posting.

A general storage facility or database management system 116 can be connected to the WAS 200 to provide the SMTP server 110 with the proper operational tools. The database management system 116 is any system that organizes and stores data related to the operation of the e-mail system, such as authenticating profiles of users and recipients, messages and billing information. Furthermore it can be modified at the option of the client so that all e-mail messages can be stored therein until deleted.

The POST server 130 functions to forward e-mail responses remote recipient's domain, after the SMTP server processes the response and determines that in fact the recipient's domain does not exist on the HEMS.

The POP3 server of the HEMS functions identically to the POP3 servers of the prior art Email servers. To check the e-mail response the e-mail client connects to the POP3 server of the HEMS, provides an account and password, and opens the client's text file to gain access.

Although FIG. 3 illustrates a single client computer 101, one skilled in the art would appreciate that the present invention can be employed with either a plurality of input computers linked separately or in a network, or with at least one SMTP server from a prior art Email Server.

Figure 4:
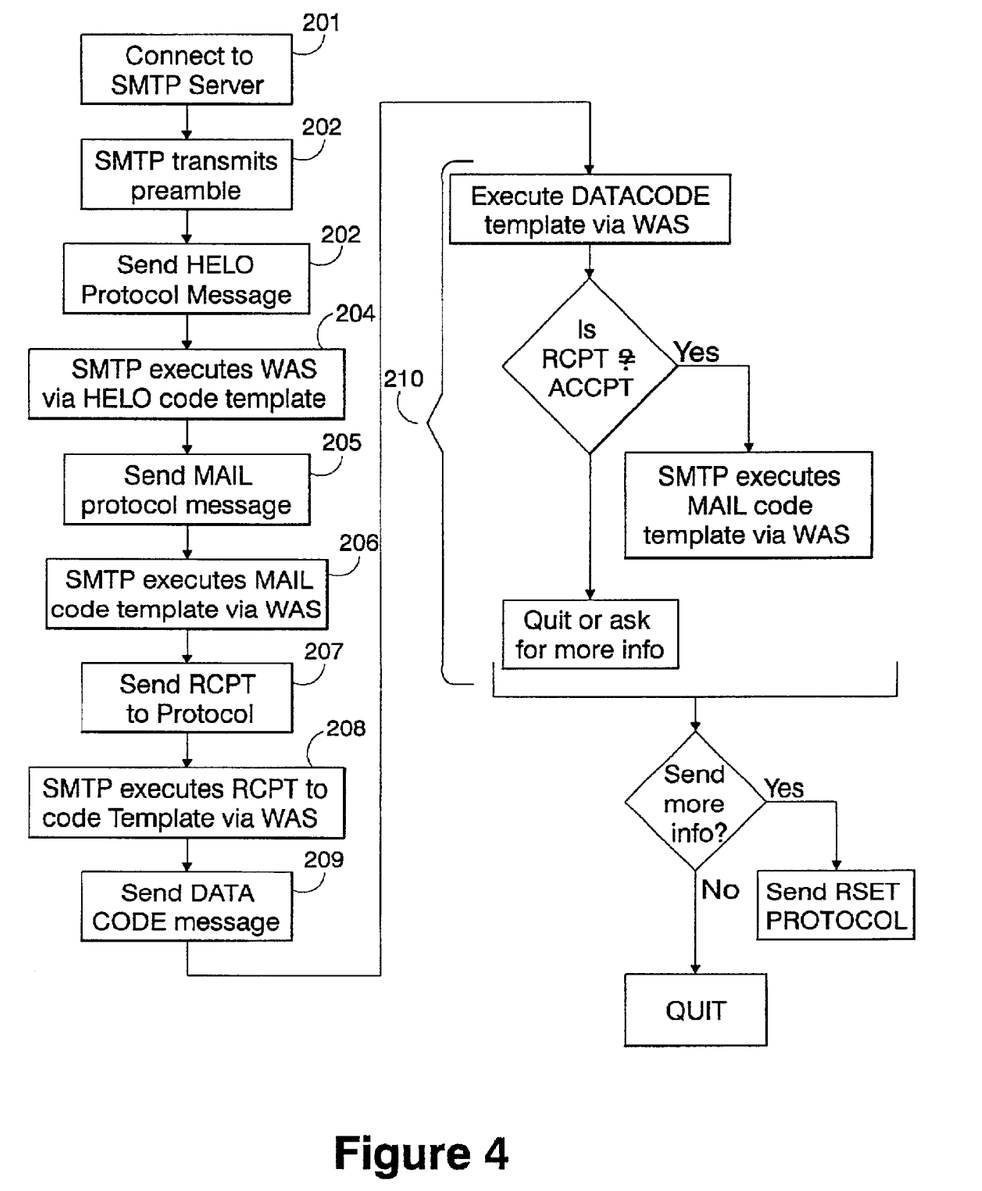
FIG. 4 is a flow chart showing the method of communication between a client computer and the inventive HEMS' SMTP server.

FIG. 4 illustrates the receipt and processing of electronic mail by the HEMS's SMTP server 110. The electronic mail may originate either directly from a client computer 101 or from another traditional prior art SMTP server on a remote prior art Email server, using SMTP protocol. Specifically the receipt and processing of e-mail comprises the following steps:

STEP 201: connecting to the SMTP server 110 using conventional SMTP protocol;

STEP 202: The SMTP Server 110 responds by transmitting a preamble text or standard protocol code connection message to either the client computer 101 or the prior art SMTP server;

STEP 203: The client computer 101 or the prior art SMTP server responds by sending to the SMTP server 110 the "HELO" or "EHLO" protocol message, which includes the user identification information;

STEP 204: The SMTP server 110 responds by retrieving and executing the "HELO" code template via the WAS 200. Depending on the response from the "HELO" code template execution, the client computer 101 or the prior art SMTP server may continue processing to the next step, be disconnected, or prompted to reenter the information;

STEP 205: If the client computer 101 or the prior art SMTP server is prompted to continue, it responds by sending to the SMTP server 110 the "MAIL:" protocol message, which includes the address of the sender;

STEP 206: The SMTP server 110 responds by retrieving and executing the "MAIL" Code templates via the WAS 200. Depending upon the response from the template execution, the client computer 101 or the prior art SMTP server may continue processing to the next step, be disconnected or prompted to reenter the information.

STEP 207: If the client computer 101 or the prior art SMTP server is prompted to continue, it responds by sending to the SMTP server 110 one or more "RCPT TO" protocol messages, which include the address of the recipient(s);

STEP 208: The SMTP server 110 receives said "RCPT TO" messages and retrieves and executes the "RCPT" Code template for each RCPT message received, via the WAS. Depending upon the response from the template execution, the client computer 101 may continue processing to the next step, be disconnected or prompted to reenter the information;

STEP 209: If the client computer 101 or the prior art SMTP server is prompted to continue it then responds by sending to the modified SMTP server 110 a "DATA" protocol message;

STEP 210: The SMTP server 110 receives said "DATA" message in its entirety and stores it in a temporary file. It then retrieves the "DATA" Code template, and any other templates it needs to read the message and collect the variables relevant and material to a search, and executes the template via the WAS 200 and through the API interface. The WAS will now process the mail, open the mail, read the mail, gather whatever information is necessary from the Internet (it is noted that there will be responses that no Internet information is necessary to formulate an answer) formulate an answer and send the answer back to the SMTP through the API interface. The SMTP is equipped with a parser which receives and evaluates the response, including whether the recipient is a valid recipient. WAS indicates a valid recipient with the expression RCPT=ACCEPT. At that point, the SMTP uses the response to determine if the recipient is local. If the recipient is local it will post the response to the local HEMS POP3 server. On the other hand, if the recipient is not local it will channel the response to the POST server which in turn will communicate with the remote prior art Email server and post said response to the remote prior art Email server's POP3 server for access by the recipient. Depending upon the response from the template execution, the client computer 101 or prior art SMTP server may continue processing to the next step, be disconnected or prompted to reenter the information.;

STEP 211: If the client computer 101 or the prior art SMTP server is prompted to continue it then responds by sending to the SMTP server 110 either a "RSET" protocol message to indicate that additional mail is being sent or the "QUIT" protocol message to disconnect the system.

Figure 5:
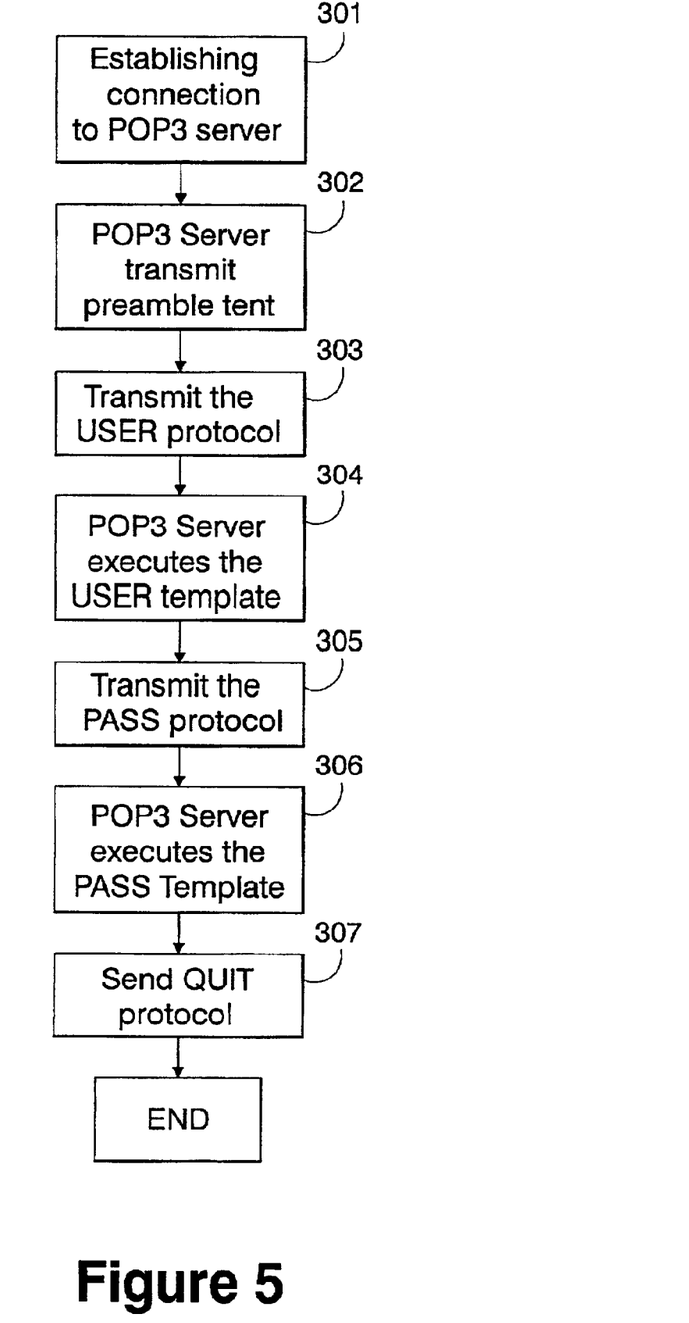
FIG. 5 is a flow chart showing the method of communication between a client computer and the inventive HEMS' POP3 server.

FIG. 5 illustrates how e-mail is retrieved from the HEMS' POP 3 server 140. Specifically such process comprises the following steps:

STEP 301: The client computer 101 establishes a connection to the POP3 Server 140;

STEP 302: The POP3 server 140 transmits a preamble text or connection message to the client computer 101;

STEP 303: The client computer 101 receives the preamble text and transmits the "USER" protocol message to the POP3 server 140;

STEP 304: The POP3 server 140 receives the "USER" protocol message and retrieves and executes the "USER" template using the scripting engine 114. Depending upon the response from the execution of the "USER" template, the client computer 101 may continue processing to the next step, be disconnected or prompted to reenter the information.

STEP 305: If the client computer 101 is prompted to continue it then responds by sending to the modified POP3 server 140 a "PASS" protocol message, which includes the user's mailbox password, from the client computer 101;

STEP 306: The POP3 server 140 receives the "PASS" protocol message and retrieves and executes the "PASS" template using the scripting engine 114. Depending upon the response from the execution of the "PASS" protocol message, the client computer 101 may continue processing to the next step, be disconnected or prompted to reenter the information. The "PASS" template will also supply a list of waiting mail to the POP3 server 140.

STEP 307 If the computer 101 is prompted to continue it then responds by either sending to the modified POP3 server 140 one or more protocol messages to retrieve the mail or by sending the "QUIT" protocol message. The "QUIT" protocol message can also be sent after the e-mail has been retrieved;

STEP 308 The POP3 server 140 receives the "QUIT" protocol message and executes the "QUIT" code template using the scripting engine 114 and shutting down the system.

The inventive system and process set forth above as well as the HEMS can serve thousands of email messages per day dependent upon several factors: System CPU (type and quantity), memory disk subsystem as well as internet connection speed available bandwith. The following are the minimum system requirements that would provide a serviceable HEMS:

Hardware

Pentium 100 (Pentium ii/300 or higher recommended)
64 MB MEMORY (128 MB or higher recommended)
5 MB disk space for software
5 MB or more disk space per user
Network interface card (100 Mhz PCI recommended)

Software

Microsoft Window NT, 95 or 98 or any other equivalent software
Allaire Coldfusion Professional or Enterprise
OR
InLine iHTML
OR
Active State Perl (ISAPI version)
Microsoft Access It will be understood that each of the elements described above, or two or more together, may also find a useful application in other types of construction differing from the types described above.

While the invention has been illustrated and described as embodied in a system and method for receiving and delivering electronic mail and electronic messages using the Internet and more particularly, as a system and method comprising a Hybrid Email Server (hereinafter "HEMS"), which utilizes standard Web Application Servers (hereinafter "WAS") for all functionality, it is not limited to the details show, since it will be understood that various omissions, modifications, substitutions and changes in forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this inventions.

What is claimed is:

1. A system for receiving, processing, forwarding, posting and accessing e-mail messages, said system comprising
   a hybrid Email server communicatingly connected to a web application server through an API interface;
   said hybrid Email server configured to receive, review, process, and forward e-mail messages from any e-mail generating means, as well as accept, post and provide access to responses to said e-mail messages;
   said API interface located on said hybrid Email server and configured to channel both e-mail messages going out of said hybrid Email server and e-mail message responses coming into said hybrid Email server; and
   said web application server configured to accept e-mail messages channeled to said web application server from said hybrid Email server through said API interface, to read the e-mail messages, to formulate responses to the e-mail messages, to channel the responses to the e-mail messages back to said hybrid Email server through said API interface, and to place the responses within said hybrid Email server.

2. A method for receiving, reviewing, processing, forwarding, posting and accessing e-mail messages, said method comprising
   communicatingly connecting a hybrid Email server to a web application server through API interface;
   configuring said hybrid Email server to receive, review, process, and forward e-mail messages from any e-mail generating means, as well as accept, post and provide access to responses to said e-mail messages;

locating said API interface on said hybrid Email server;

configuring said API interface to channel both e-mail messages going out of said hybrid Email server and e-mail message responses coming into said hybrid Email server; and configuring said web application server to accept e-mail messages channeled to said web application server from said hybrid Email server through said API interface, to read the e-mail messages, to formulate responses to the e-mail messages, to channel the responses to the e-mail messages back to said hybrid Email server through said API interface, and to place the responses within said hybrid Email server.

* * * * *